United States Patent
Bruening et al.

(10) Patent No.: US 11,926,087 B2
(45) Date of Patent: Mar. 12, 2024

(54) AUTONOMOUS POLYMER COMPOUNDING OPTIMIZATION

(71) Applicant: Konica Minolta Business Solutions U.S.A., Inc., San Mateo, CA (US)

(72) Inventors: Karsten Bruening, Portola Valley, CA (US); Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 988 days.

(21) Appl. No.: 16/836,309

(22) Filed: Mar. 31, 2020

(65) Prior Publication Data

US 2021/0299930 A1   Sep. 30, 2021

(51) Int. Cl.
  *B29C 48/92*   (2019.01)
(52) U.S. Cl.
  CPC .... B29C 48/92 (2019.02); *B29C 2948/92028* (2019.02); *B29C 2948/92447* (2019.02)
(58) Field of Classification Search
  CPC .......................................... B29C 2948/92028
  See application file for complete search history.

(56) References Cited

U.S. PATENT DOCUMENTS

| | | | | |
|---|---|---|---|---|
| 3,650,644 | A * | 3/1972 | Ebert | B29C 48/10 425/66 |
| 2019/0115778 | A1 | 4/2019 | Ermon et al. | |
| 2019/0217522 | A1* | 7/2019 | Nieto | B29C 48/10 |
| 2021/0162645 | A1* | 6/2021 | Wilson | G01M 11/0292 |

FOREIGN PATENT DOCUMENTS

| DE | 2635585 A1 | 2/1978 |
|---|---|---|
| DE | 102009003751 A1 | 10/2010 |

OTHER PUBLICATIONS

Collin DE2635585 A1 English Translation 1978 (Year: 1978).*
Peter M. Attia et al., "Closed-loop optimization of fast-charging protocols for batteries with machine learning", Nature vol. 578, Feb. 20, 2020 (21 pages).

* cited by examiner

*Primary Examiner* — Jacob T Minskey
(74) *Attorney, Agent, or Firm* — Osha Bergman Watanabe & Burton LLP

(57) ABSTRACT

A testing apparatus for obtaining mechanical properties of a polymer composite extruded from a nozzle of a compounding extruder includes a plurality of pairs of roller units that roll the polymer composite along a first direction. Each of the pairs of roller units includes a first roller unit and a second roller unit disposed such that a center of the first roller unit and a center of the second roller unit are separated by a predetermined distance in a second direction that is perpendicular to the first direction. The pairs of roller units are disposed along the first direction such that the predetermined distance of each of the pairs of roller units increases stepwise along the first direction. The pairs of roller units strain a vulnerable portion of the polymer composite in the second direction. The testing apparatus further includes a sensor that measures stress in the vulnerable portion.

16 Claims, 7 Drawing Sheets

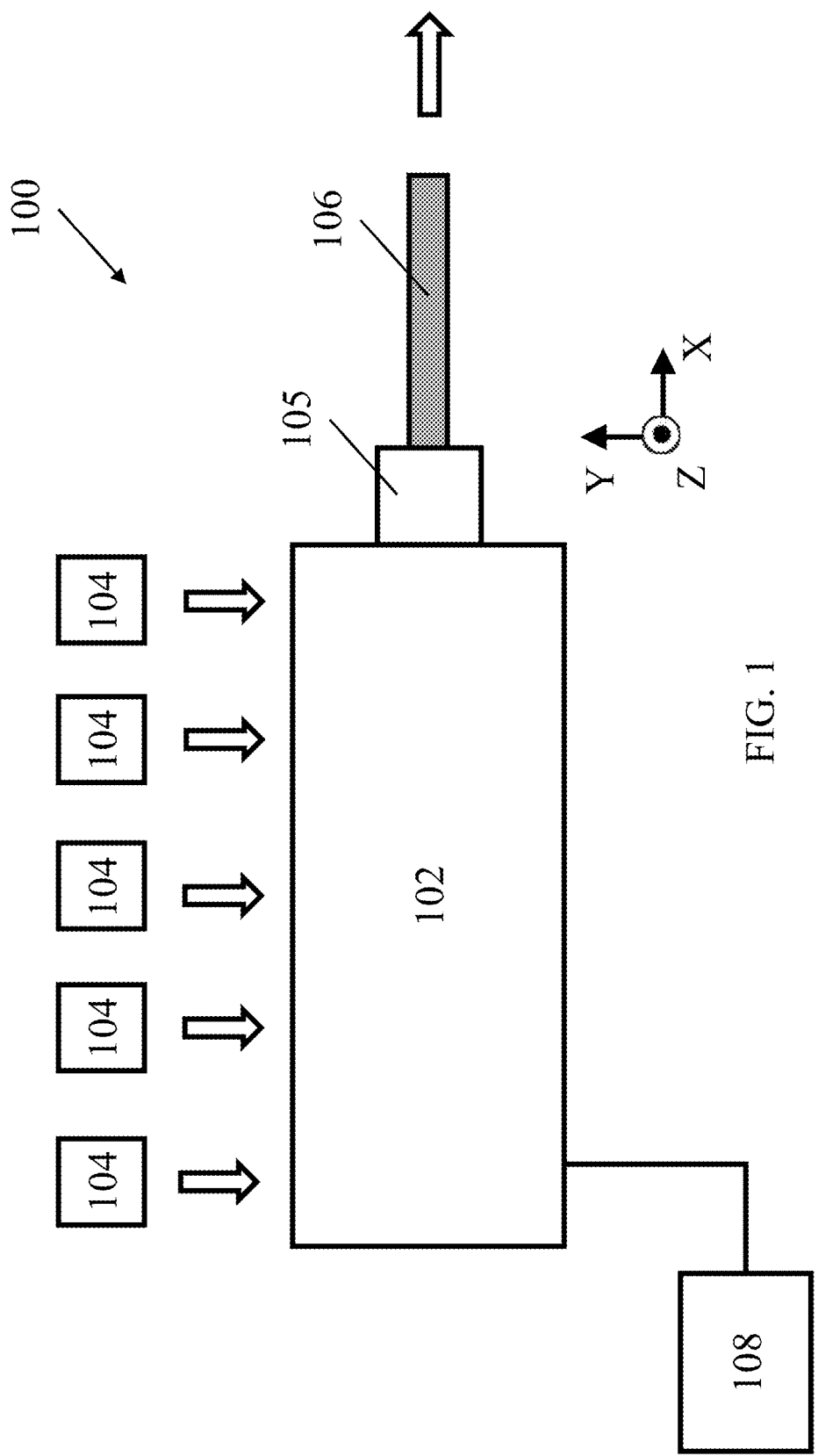

AUTONOMOUS POLYMER COMPOUNDING OPTIMIZATION

BACKGROUND

A polymer composite may be manufactured by mixing multiple polymers, fillers, precursors, additives and other ingredients at specific ratios and temperatures (i.e., variables) in a compounding extruder. These variables along with various other variables (e.g., extrusion speed), determine the mechanical properties of the polymer composite that is extruded out of the compounding extruder. By adjusting these variables, the mechanical properties of the polymer composite can be optimized. However, because of the sheer number of variables that can affect the mechanical properties of the polymer composite, optimization of the mechanical properties using conventional methods can be inefficient.

SUMMARY

In one aspect, embodiments of the present invention are directed to a testing apparatus for obtaining mechanical properties of a polymer composite extruded from a nozzle of a compounding extruder. The testing apparatus includes a plurality of pairs of roller units that roll the polymer composite along a first direction. Each of the pairs of roller units includes a first roller unit and a second roller unit disposed such that a center of the first roller unit and a center of the second roller unit are separated by a predetermined distance in a second direction that is perpendicular to the first direction. The pairs of roller units are disposed along the first direction such that the predetermined distance of each of the pairs of roller units increases stepwise along the first direction. The pairs of roller units strain a vulnerable portion of the polymer composite in the second direction. The testing apparatus further includes a sensor that measures stress in the vulnerable portion.

In one aspect, embodiments of the present invention are directed to a method for measuring mechanical properties of a polymer composite extruded from a nozzle of a compounding extruder. The method includes rolling the polymer composite along a first direction using a plurality of pairs of roller units. Each of the pairs of roller units includes a first roller unit and a second roller unit. A center of the first roller unit and a center of the second roller unit are separated by a predetermined distance in a second direction that is perpendicular to the first direction. The predetermined distance of each of the pairs of roller units increases stepwise with respect to the first direction. The method further includes: straining a vulnerable portion of the polymer composite in the second direction; and measuring stress in the vulnerable portion using a sensor.

In one aspect, embodiments of the present invention are directed to a non-transitory computer readable medium (CRM) storing instructions for performing operation that causes a testing apparatus to obtain mechanical properties of a polymer composite extruded from a nozzle of a compounding extruder. The operation includes rolling the polymer composite along a first direction using a plurality of pairs of roller units. Each of the pairs of roller units includes a first roller unit and a second roller unit. A center of the first roller unit and a center of the second roller unit are separated by a predetermined distance in a second direction that is perpendicular to the first direction. The predetermined distance of each of the pairs of roller units increases stepwise with respect to the first direction. The operation further includes: straining a vulnerable portion of the polymer composite in the second direction; and measuring stress in the vulnerable portion using a sensor.

In one aspect, embodiments of the present invention are directed to a method for manufacturing a polymer composite using a compounding extruder. The method includes: defining a design space for polymer compounding and extruding of the polymer composite; initializing design space parameters for the polymer compounding and the extruding based on the design space, wherein the design space parameters include compounding variables for the polymer compounding and extruding of the polymer composite; causing the compounding extruder to extrude the polymer composite from a nozzle of the compounding extruder using the design space parameters; causing a testing apparatus to strain a vulnerable portion of the polymer composite; obtaining strain in the vulnerable portion; obtaining stress in the vulnerable portion; obtaining mechanical properties of the polymer composite based on the obtained stress and strain of the vulnerable portion; comparing the obtained mechanical properties of the polymer composite with target mechanical property values; and modifying the compounding variables based on the obtained mechanical properties of current and previous iterations using an optimization algorithm.

In one aspect, embodiments of the present invention are directed to a CRM storing instructions for performing operation that causes a testing apparatus to obtain mechanical properties of a polymer composite extruded from a nozzle of a compounding extruder. The operation includes: defining a design space for polymer compounding and extruding of the polymer composite; initializing design space parameters for the polymer compounding and the extruding based on the design space, wherein the design space parameters include compounding variables for the polymer compounding and extruding of the polymer composite; causing the compounding extruder to extrude the polymer composite from a nozzle of the compounding extruder using the design space parameters; causing a testing apparatus to strain a vulnerable portion of the polymer composite; obtaining strain in the vulnerable portion; obtaining stress in the vulnerable portion; obtaining mechanical properties of the polymer composite based on the obtained stress and strain of the vulnerable portion; comparing the obtained mechanical properties of the polymer composite with target mechanical property values; and modifying the compounding variables based on the obtained mechanical properties of current and previous iterations using an optimization algorithm.

Other aspects of the invention will be apparent from the following description and the appended claims.

BRIEF DESCRIPTION OF DRAWINGS

FIG. 1 shows a diagram illustrating an example of a compounding extruder.

DETAILED DESCRIPTION

Figure 2A:
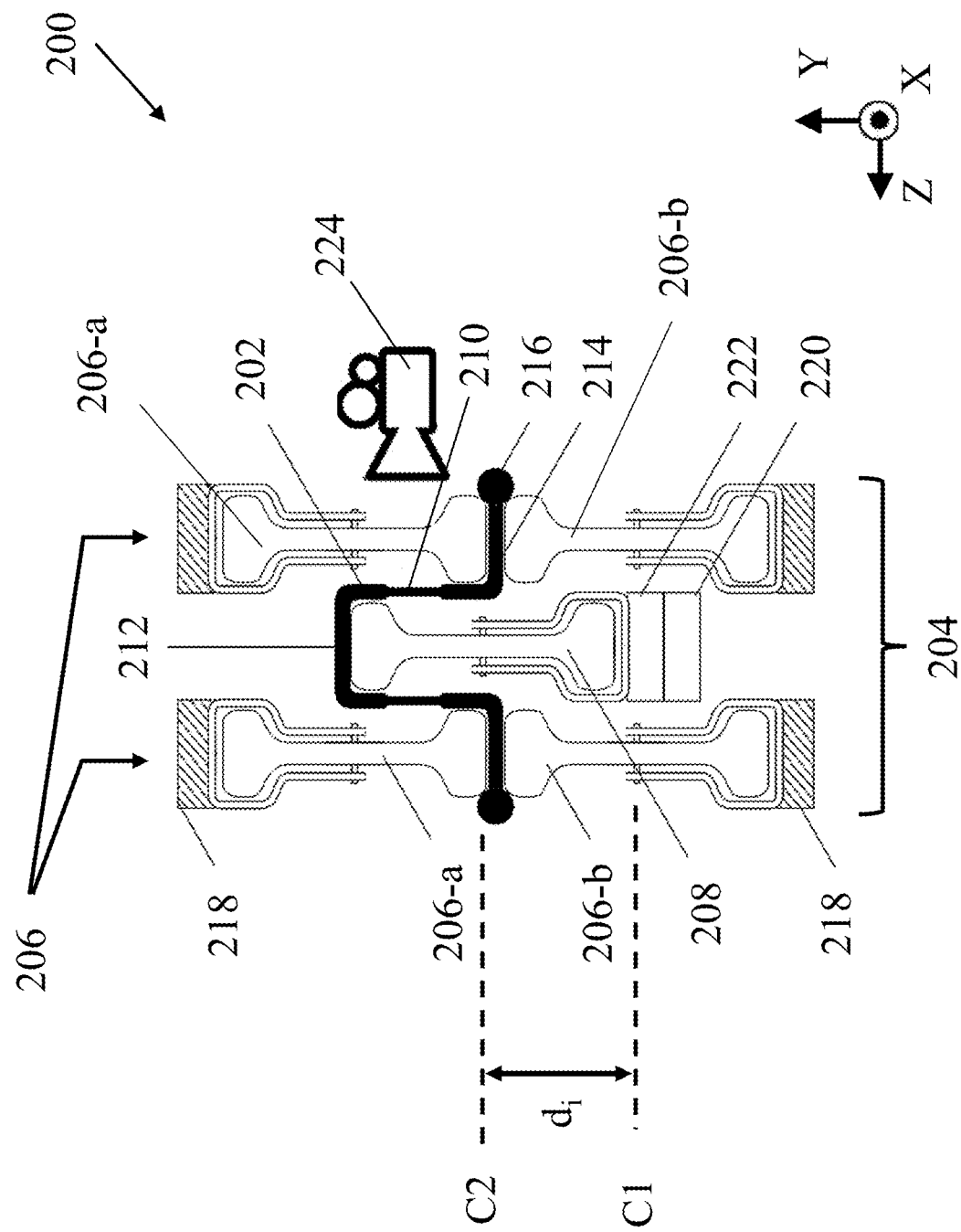
FIG. 2A shows a cross-sectional view of a testing apparatus in accordance with one or more embodiments.

Specific embodiments of the invention will now be described in detail with reference to the accompanying figures Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide an apparatus, method, and non-transitory computer readable medium (CRM) for optimizing polymer composites that may be generated via compounding extruders. More specifically, embodiments of the invention provide an apparatus, method, and CRM for obtaining mechanical properties of the polymer composites extruded from the compounding extruder, as well as an apparatus, method, and CRM for manufacturing the polymer composite using the compounding extruder.

As shown in FIG. 1, a compounding extruder (100) according to one or more embodiments includes a body (102) that mixes various ingredients (104) together (e.g., via mixing screws (not shown), and a nozzle (105) from which a polymer composite (106) is extruded in an extrusion direction. The arrow on the right side of the polymer composite (106) shows the extrusion direction. An example of the compounding extruder (100) is a twin screw extruder that heats and mixes different polymers and precursors using two coupled screws in the body (102). The two coupled screws push the mixture toward the nozzle (105) to extrude the mixture. In one or more embodiments, a control panel (108) may be connected (wirelessly or with connection cables such as LAN) to the compounding extruder (100) to control operations of the compounding extruder (100). The control panel (108) may be a personal computer including a memory to store operation instructions and a processor to process the operation instructions and submit the operation instructions to the compounding extruder (100).

Various variables such as types or weight ratios of ingredients (e.g., polymers, fillers, and additives), heating temperature, heating time, speed of extrusion, rotating speed of the mixing screws, etc. are considered during the mixing and extruding of the polymer composite. These and other variables may be adjusted to extrude a polymer composite that has mechanical properties that are optimum according to certain manufacturing standards of a manufacturer. Hereinafter, such variables are referred to as "compounding variables."

According to one or more embodiments, a feedback mechanism may be used in the manufacturing of the extruded polymer composite. The feedback mechanism may adjust the compound variables using the results of measurements taken during the manufacturing process to optimize the mechanical properties of the polymer composite. The feedback mechanism may be performed autonomously for more efficient manufacturing of the polymer composite. For example, a user may enter specific values or thresholds for certain mechanical properties of the polymer composite on the control panel (108) of the compounding extruder (100). Then, the feedback mechanism may autonomously adjust the compounding variables to extrude the polymer composite with mechanical properties that match the specific values or thresholds. The feedback mechanism is described in more detail below in reference to FIGS. 2A-2B, 3, and 5.

According to one or more embodiments, to perform the feedback mechanism, a testing apparatus may be used to strain the polymer composite (106) (i.e., apply displacement (strain) to the polymer composite (106)) and obtain mechanical properties of the polymer composite (106). For this, a force-displacement curve of the polymer composite (106) (i.e., a relation between the displacement (strain) and a force applied to the polymer composite (106) to create the displacement) may be obtained. Then, a stress-strain curve can be computed according to the force-displacement curve of the polymer composite (106). Then, other mechanical properties of the polymer composite (106) (e.g., tensile modulus, yield stress, failure stress, and strain at break) may be calculated based on the stress-strain curve. The calculated mechanical properties of the polymer composite (106) may then be used as input values of an optimization algorithm in the feedback mechanism to adjust the compounding variables.

Figure 2B:
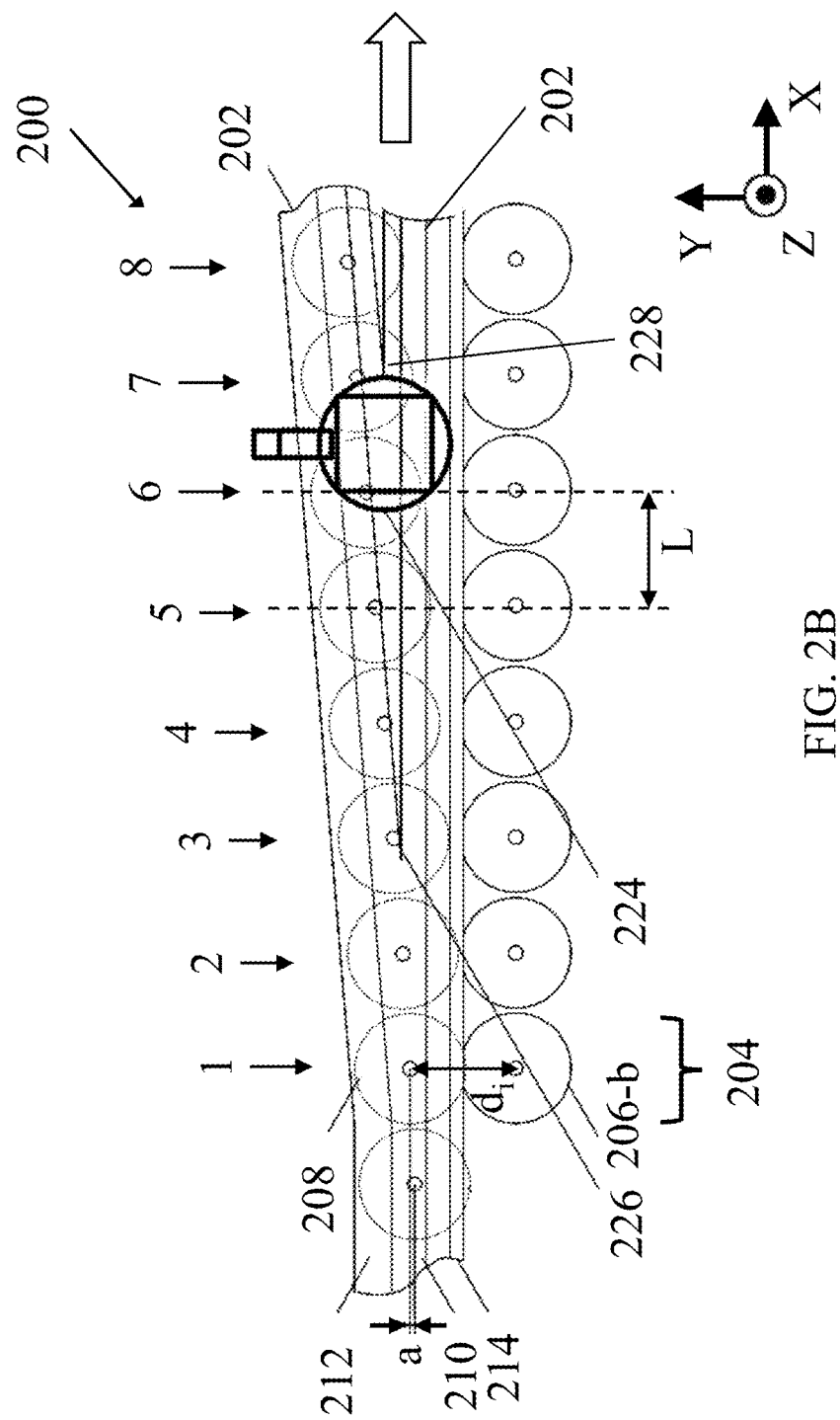
FIG. 2B shows a side view of the testing apparatus shown in FIG. 2A.

FIGS. 2A and 2B show a cross-sectional view and a side view, respectively, of a testing apparatus (200) according to one or more embodiments that may be used as part of the feedback mechanism. For simplicity of illustration, some of the elements shown in FIG. 2A are not shown in FIG. 2B, and vice versa. As shown in FIGS. 2A and 2B, an extruded polymer composite (202, 106) may be fed to the testing apparatus (200) along an X-axis (i.e., a first direction). For example, the testing apparatus (200) may be disposed on the right side of the nozzle (105) of the compounding extruder (100) discussed above with reference to FIG. 1. There may be a water bath between the compounding extruder (100) and the testing apparatus (200). The testing apparatus (200) may have a plurality of pairs of roller units (204) that roll the polymer composite (202) out of the nozzle (105) of the compounding extruder (100). FIG. 2A shows a cross-sectional view of just one of the pairs of roller units (204) for simplicity of illustration. Each of the pairs of roller units (204) may include a first roller unit (206) and a second roller unit (208) corresponding to the first roller unit (206) in the pair. The testing apparatus (200) may strain the polymer composite (202) for testing the mechanical properties of the polymer composite.

In one or more embodiments, as shown in FIG. 2A, the first roller unit (206) may include a pair of upper rollers (206-a) and a pair of lower rollers (206-b), and the second roller unit (208) may be between the pair of upper rollers (206-a) and the pair of lower rollers (206-b) along the Y-axis (i.e., second direction) and along the Z-axis (i.e., third direction). Although the pair of roller units (204) illustrated in FIG. 2A includes five total rollers (i.e., four rollers in the first roller unit (206) and one in the second roller unit (208)), the number of rollers may be lower or higher than five. For example, the first roller unit (206) may include multiple pairs of upper rollers (206-a) and lower rollers (206-b), and the second roller unit (208) may include more than one roller. Hereinafter, the second roller unit (208) may be referred to as "center roller."

Still referring to FIG. 2A, to obtain the tensile strength of the strained polymer composite (202), a portion of the polymer composite (202) that is vulnerable to straining (e.g., owing to a reduced cross sectional thickness) may be measured as a representative of the entire polymer composite (202). Using the vulnerable portion helps maintain consistency of the measurements and preventing other portions of the polymer composite (202) from breaking down because the strain is predominantly localized in the vulnerable portion. Accordingly, the polymer composite (202) can be extruded with a profile having the vulnerable portion. For example, the cross-sectional profile of the polymer composite (202) in FIG. 2A has a U-shaped profile with thin side walls (210) surrounded by a thicker upper portion (212) and a thicker lower portion (214). This geometry that includes a thinner section between two thicker sections may be referred to as a "dog-bone geometry." Either one (or both) of the thin side walls (210) may be used as the vulnerable portion because the thin side walls (210) stretch more than the thicker upper and lower portions (212, 214) under tension. To prevent the polymer composite (202) from slipping between the rollers of the pair of roller units (204), the polymer composite (202) may have beaded ends (216).

According to one or more embodiments, the cross-sectional profile of the polymer composite (202) may be produced and determined by the nozzle of the compounding extruder. For example, as shown in FIG. 2A, a slit of the nozzle that extrudes the polymer composite (202) may be similar in shape to the U-shaped profile. Other cross-sectional profiles may also be used based on specific designs or functions of the polymer composite (202), the testing apparatus (200), or the compounding extruder (100).

Continuing with FIG. 2A, the pair of upper rollers (206-a) and the pair of lower rollers (206-b) roll the thicker lower portion (214) while the second roller unit (208) rolls the thicker upper portion (212) of the polymer composite (202). Guides of the upper rollers (206-a) and lower rollers (206-b) may be fixed to mounts (218) such that the guides do not move during rolling of the polymer composite (202). The guide of the second roller unit (208) may also be fixed to a mount (220). Positions of the mounts (218, 220) may be adjusted based on specific design and function of the testing apparatus (200). For example, the mount (220) may include a set screw for adjusting the position of the mount (220) for the guide of the second roller unit (208) along the X-, Y-, or Z-axes (i.e., first, second, and third directions, respectively).

Referring still to FIG. 2A, in each of the pairs of roller units (204) the first roller unit (206) and a second roller unit (208) are disposed such that a center (C1) of the first roller unit (206) and a center (C2) of the second roller unit (208) are separated by a predetermined distance ($d_i$) along the Y-axis. Further details regarding this predetermined distance ($d_i$) will be discussed later with reference to FIG. 2B. Here, subscript "i" in "$d_i$" refers to the number of the pair of the roller units (204).

FIG. 2B shows a side view of the testing apparatus (200) of FIG. 2A according to one or more embodiments. The arrow on the right side of FIG. 2B indicates the X-axis along which the polymer composite (202) is extruded. For simplicity, the upper rollers (206-a), load cells (218, 220), mounts (218, 220), and some of the other elements shown in FIG. 2A are not shown in FIG. 2B. In this example, there are eight pairs of roller units (204) numbered 1 to 8 from left to right rolling the extruded polymer composite (202). In FIG. 2B, the numbers of the pairs of roller units (204) are shown above each of the pairs of roller units (204). In each of the pairs of roller units (204), the lower rollers (206-b) of the first roller unit (206 in FIG. 2A) roll the thicker lower portion (214) while the second roller unit (208) rolls the thicker upper portion (212) of the polymer composite (202). Adjacent lower rollers (206-b) may be spaced along the X-axis by distance "L" and disposed at the same height along Y-axis. In one or more embodiments, the distance "L" may be constant. Alternatively, the distance "L" may be different between each lower roller (206-b).

In one or more embodiments as shown in FIG. 2B, the multiple pairs of roller units (204) may be disposed along the X-axis such that the predetermined distance ($d_i$) of each of the pairs of roller units (204) increases gradually (or stepwise) along the X-axis. Thus, as the polymer composite (202) moves from one pair of roller units (204) to an adjacent pair of roller units (204), the side walls (210) of the polymer composite (202) are strained. More specifically, the stepwise increase of the predetermined distance ($d_i$) from one pair of roller units (204) to the next along the X-axis allows strain to be applied, which increasingly strains (i.e., deforms or stretches) the thin side walls (210) as the polymer composite (202) rolls through the multiple pairs of roller units (204) along the X-axis. By knowing the predetermined distances ($d_i$) of the multiple pairs of roller units (204), the strain in the thin side walls (210) can be calculated, as explained further below.

According to one or more embodiments, the predetermined distance ($d_i$), the difference between predetermined distances ($d_i$) of adjacent pairs of roller units (204), or the number of pairs of roller units (204) along the testing apparatus (200) can be determined and adjusted based on a specific type of the polymer composite (202). For example, for testing more elastic polymer composites (202) the difference between predetermined distances ($d_i$) of adjacent pairs of roller units (204) may be higher than for testing less elastic polymer composites (202). In one or more embodiments, the predetermined distance ($d_i$), the difference between predetermined distances ($d_i$) of adjacent pairs of roller units (204), or the number of pairs of roller units (204) along the testing apparatus (200) can be chosen to see a specific mechanical property (e.g., yield point or fracture point) along the testing apparatus (200). Yield point and fracture point are explained further below with reference to FIG. 3.

In one or more embodiments, the predetermined distance ($d_i$) may increase linearly from pair 1 to pair 8 among the pairs of roller units (204). In this example, centers of adjacent second roller units (208) may be spaced from each other by a distance "a" along the Y-axis, as shown in FIG. 2B. Accordingly, as the polymer composite (202) is rolled from one pair of roller units (204) to an adjacent pair of roller units (204) along the X-axis, the side walls (210) of the polymer composite (202) are strained by "a." In this example, the strain of the thin side walls (210) on the pairs of roller units (204) can be calculated by the following equation:

$$\epsilon = a \frac{i}{l_0} \qquad \text{(Equation 1)}$$

In Equation 1, "$\epsilon$" is the strain of the thin side walls (210), and "i" is the number of the pair of roller units (204). In FIG. 2B, "i" is 1 to 8 and is shown above each of the pairs of roller units (204). "$l_0$" is a gauge length of the thin side walls (210), which is the length of the thin side walls (210) along the Y-axis.

Although eight pairs of roller units (204) are shown in FIG. 2B, the number of pairs of roller units (204) may be higher or lower depending on specific designs and functions of the testing apparatus (200).

In one or more embodiments, stress in the thin side walls (210) may be obtained using a mechanical sensor or an optical sensor. For example, as shown in FIG. 2A, mechanical sensors such as load cells (222) may be disposed under the guide of each second roller unit (208) to measure the force applied to the second roller unit (208) as strain is applied on the thin side walls (210) of the polymer composite (202). Then, the measured force can be used to obtain the stress.

According to one or more embodiments, as shown in FIGS. 2A and 2B, the optical sensors for obtaining the stress in the thin side walls of the polymer composite (210) may include a camera (224) that measures optical property changes, such as refractivity and/or haze of the thin side walls and uses computer vision to obtain the stress on the thin side walls (210). For example, the camera (224) may acquire a picture or a sequence of pictures from the thin side walls (210) at specific locations along the extruded polymer composite (202). Then, the acquired pictures may be compared with pre-saved images of similar side walls, which are correlated with various stress values. For example, the pre-saved images may be results of past experiments for determining the mechanical properties of similar polymer composites. Although the strain can be calculated based on the position of the thin side walls (210) on the testing apparatus (as explained below), the optical sensors may also be used to obtain the strain using the measured optical property changes. For example, in one or more embodiments, the strain may be obtained based on the length of the thin side walls (210) along the Y-axis in the pictures taken by the camera (224).

In one or more embodiments, for taking the pictures, the upper rollers (206-a) may include one or more holes for the camera (224) to view the thin side walls (210). In another example, at least a portion of one or more of the upper rollers (206-a) may be made of a transparent material such that the thin side walls (210) can be seen through the upper rollers (206-a).

According to one or more embodiments, another example of the optical sensor may include a light source such as a laser that emits light onto at least one of the thin side walls (210). The optical sensor of this example may include a photodetector (e.g., photo diode and/or spectrometer) that is disposed on the opposite side of the thin side wall (210) to measure the intensity of transmitted light and/or other optical properties, such as wavelength and polarization modulation through the thin side wall (210). Then, the measured optical property changes may be compared with various predetermined optical property values that are correlated with different tensile strengths. These predetermined optical property values may be stored in a database that includes the results of past experiments for determining the mechanical properties of similar polymer composites. To emit light on the thin side wall (210), at least one of the upper rollers (206-a) may include one or more holes or at least a portion of the upper rollers (206-a) may be made of a transparent material for the light to pass through.

According to one or more embodiments, some of the mechanical properties that may be obtained based on the obtained stress are yield point and fracture point. Yield point is a point after which the polymer composite (202) loses its elasticity and does not follow a linear relation between stress and strain. Fracture point is a point at which the polymer composite (202) fractures. Illustrations of the yield point (226) and fracture point (228) of the polymer composite (202) are shown in FIG. 2B. The mechanical or optical sensors may be used to directly detect the yield point (226) and fracture point (228).

Figure 3:
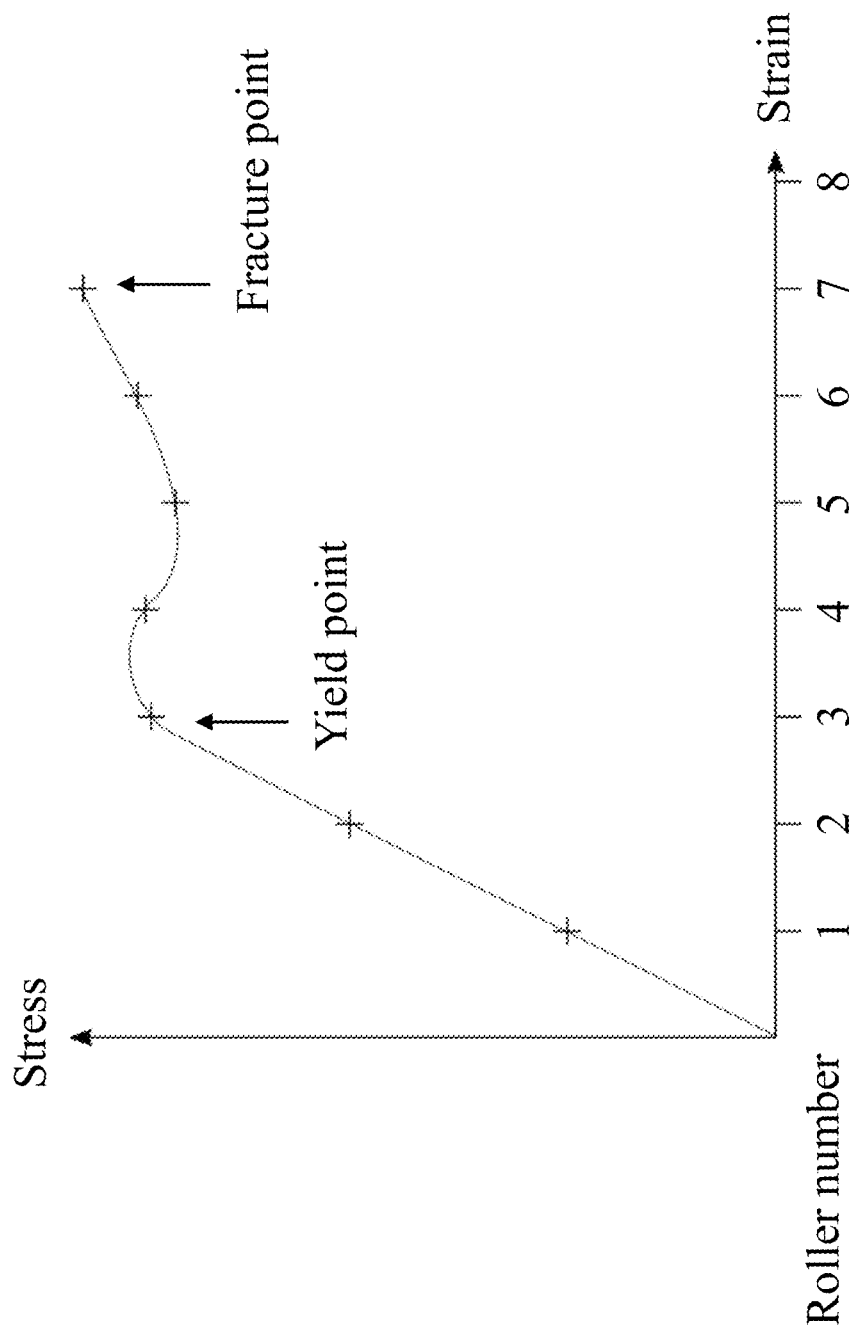
FIG. 3 shows a diagram showing strain and stress data obtained via the testing apparatus in accordance with one or more embodiments.

FIG. 3 shows an example of the strain and respective stress data. As explained above, the strain may be obtained (e.g., by using Equation 1 or by using the optical sensor) and the stress may be obtained (e.g., by using the load cells (222) or by using the optical sensor) in accordance with one or more embodiments. As explained above, based on the strain and stress data, other mechanical properties of the polymer composite such as the yield and fracture points may be calculated. For example, in FIG. 3, the yield point and fracture point are at rollers number 3 and 7, respectively.

According to one or more embodiments, the obtained mechanical properties may be fed into an optimization algorithm that may adjust the compounding variables to optimize the mechanical properties of the polymer composite. The optimization algorithm may be at least one of: a Pareto optimization that can optimize for multiple targets or a Bayesian optimization using Gaussian processes.

According to one or more embodiments, the feedback mechanism may repeatedly perform the extrusion, the obtaining of the mechanical properties, and the optimizations and adjustments of the compounding variables until the obtained mechanical properties are optimum. For example, the goal of the feedback mechanism may be to extrude a polymer composite that has mechanical properties values that are less or more than target mechanical properties values by a predetermined threshold (i.e., tolerance around the target mechanical property values). The target mechanical properties value and predetermined threshold may be defined (i.e., pre-selected and/or predetermined) by an operator (i.e., user) of the compounding extruder.

In one or more embodiments, the feedback mechanism may be performed autonomously. For example, the compounding extruder may receive the initial values of the compounding variables, the range of available compounding variables, the target mechanical properties values, and the predetermined threshold from the operator or from a file saved in the control panel of the compounding extruder. Then, the feedback mechanism may be performed autonomously by the control panel to obtain a polymer composite with mechanical properties that are optimum based on these received values. Upon achieving the optimal mechanical properties, compounding variables corresponding to the optimal mechanical properties may be used to extrude a polymer composite in a manufacturing line. For example, the compounding variables corresponding to the optimal mechanical properties may be stored in a database for future use. In one or more embodiments, the optimal mechanical properties may be validated using standard mechanical testing (e.g., tensile or impact). After validation, the compounding variables corresponding to the optimal mechanical properties may be used in the compounding extruder (or another compounding extruder) or an injection molding machine.

For the optimization of the compounding variables, the compounding variables may be changed at a time scale that is slower than the obtaining of the mechanical properties. In other words, during each testing, the compounding variables may remain at the same values. For example, while the stress and strain are obtained from roller pair 1 to roller pair 8 in FIG. 2B, the compounding variables may remain at the same values while the polymer composite passes through these roller pairs.

In one or more embodiments, the time scale of adjusting the compounding variables may depend on variables such as the extrusion speed, the length of the testing apparatus, optimization speed, etc. For example, for a laboratory-scale extrusion with a throughput of 1 to 20 kilogram per hour (kg/h), the extrusion speed could be around 5 to 100 meter per hour (m/h). Accordingly, for 1 minute, 1 m of the polymer composite may be extruded. If the testing apparatus is about 1 m long along the extrusion direction, taking the tensile strength data may take about 1 minute. The time for calculating the mechanical properties and for adjusting the compounding variables along with other times are added to this 1 minute.

According to one or more embodiments, in addition to the aforementioned properties, various other properties of the polymer composite (such as electrical conductivity, color, friction, hardness, etc.) may be obtained and optimized.

Figure 4:
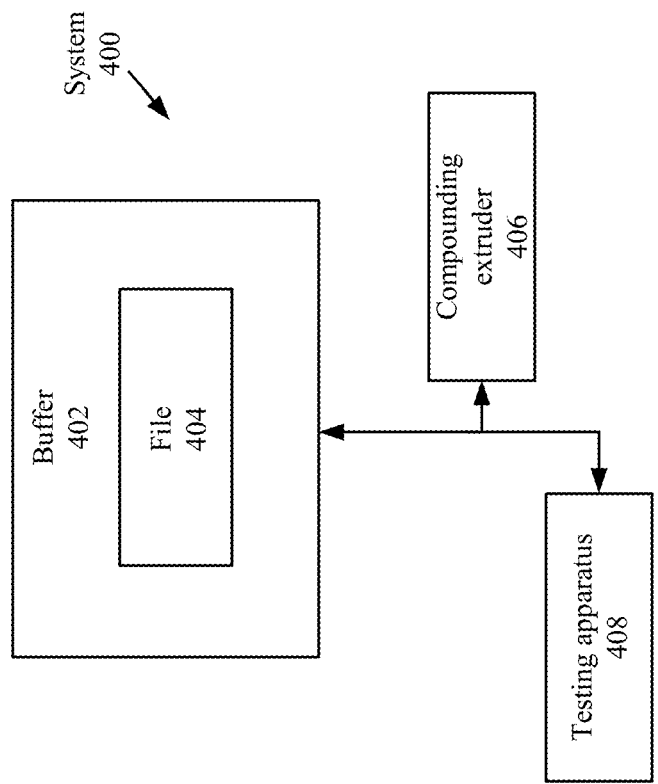
FIG. 4 shows a system for manufacturing polymer composites in accordance with one or more embodiments.

FIG. 4 shows a system (400) with multiple components, including, for example, a buffer (402), a compounding extruder (406) (which may be identical to the compounding extruder (100) described above), and a testing apparatus (408) (which may be identical to the testing apparatus (200) described above) for obtaining the mechanical properties of the polymer composite. Examples of the testing apparatus (408) are explained above with reference to FIGS. 2A-2B. The buffer (402) may be located on a computing device (e.g., personal computer (PC), laptop, tablet PC, smart phone, kiosk, server, etc.) or on different computing devices connected by a network of any size having wired and/or wireless segments. The buffer (402) may include instructions for operation of the compounding extruder (406) or testing apparatus (408) in a file (404). The buffer (402) may be connected to the compounding extruder (406) or testing apparatus (408) via a network to perform the instructions. The buffer (402) may be implemented in hardware (i.e., circuitry), software, or any combination thereof. The file (404) may include initial values of the compounding variables, the optimization algorithm, data from previous optimizations, data supplied by a raw material supplier, data that is used for the obtaining of the mechanical properties, programs that are used to run other components, etc.

Figure 5:
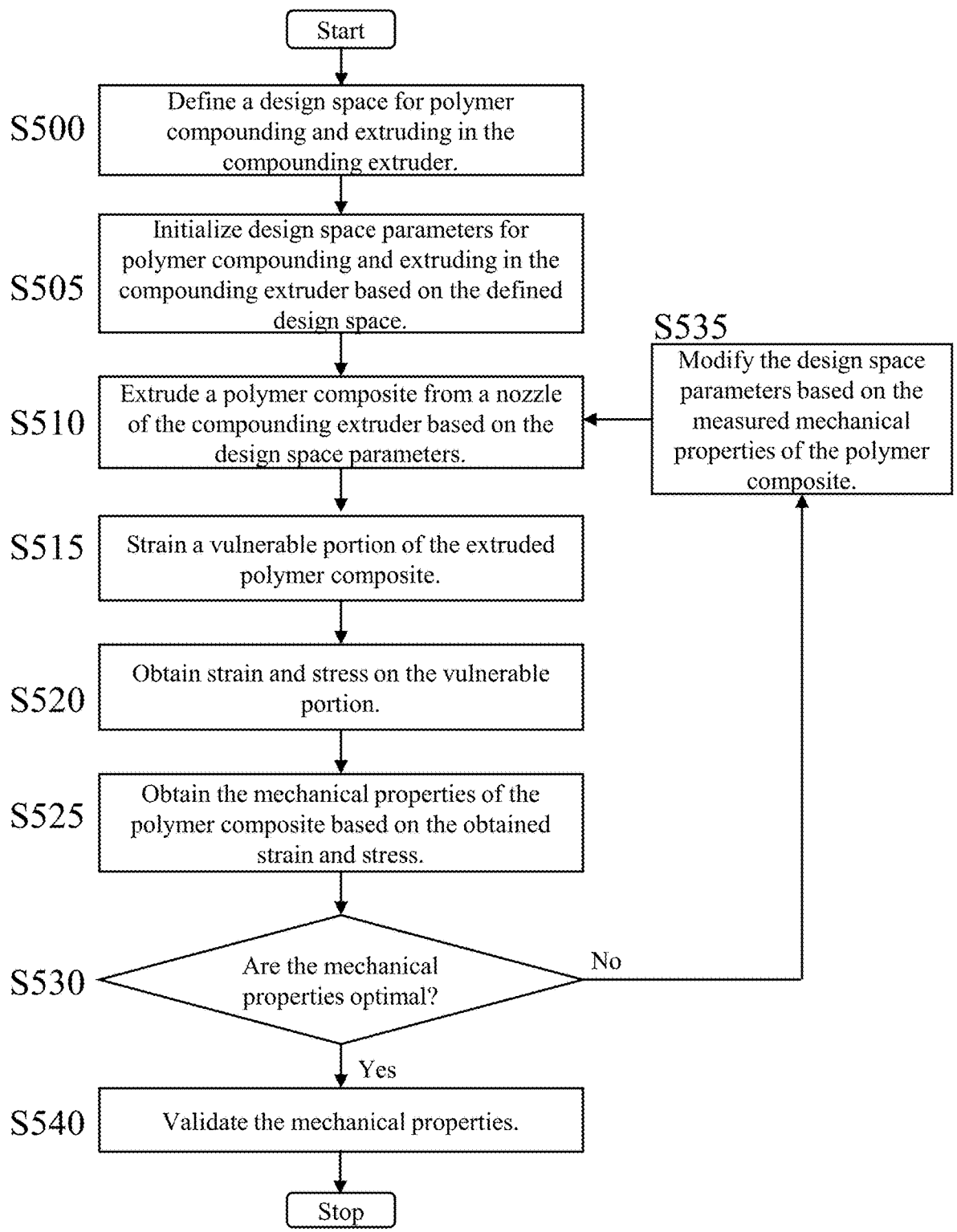
FIG. 5 shows a flowchart of a method for manufacturing the polymer composites in accordance with one or more embodiments.

FIG. 5 shows a flowchart illustrating a method for optimizing mechanical properties of the polymer composite. One or more steps in FIG. 5 may be performed by the combination of the compounding extruder (100) and testing apparatus (200) as described above in reference to FIGS. 1, 2A, and 2B, respectively. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. Steps 500 to 540 (S500-S540) shown in FIG. 5 are explained below.

In S500, a design space and design space parameters for polymer compounding and extruding in the compounding extruder is defined. For example, the design space parameters include one or more of the compounding variables that are used for optimizing the polymer composite (e.g., available ingredients, range of weight ratios, or range of temperatures). In addition, the performance space is defined (e.g. target for mechanical properties).

In S505, design space parameters for polymer compounding and extruding in the compounding extruder are initialized based on the defined design space. For example, initial values of the compounding variables may be defined as starting values for the extruding and optimization of the polymer composite. As discussed above in reference to FIG. 1, the initial values may be entered by an operator in a control panel of the compounding extruder or may be selected based on the data stored in a file (e.g., the file (404) in the system (400) shown in FIG. 4).

In S510, based on the design space parameters, the compounding extruder extrudes the polymer composite from a nozzle of the compounding extruder. For example, based on instructions from the operator, the control panel causes the compounding extruder to extrude the polymer composite.

In S515, a testing apparatus is caused to strain a vulnerable portion of the extruded polymer composite. For example, the testing apparatus (200) shown in FIGS. 2A and 2B may apply strain in the thin side walls (210) of the polymer composite (202).

In S520, the testing apparatus obtains strain and stress on the vulnerable portion. For example, the strain can be calculated using Equation 1 or can be obtained using the optical sensor, and the stress can be obtained using the optical sensor or using the force measured by the load cells (222). In one or more embodiments, obtaining the stress using the sensors (e.g., optical sensors or load cells) is referred to as measuring the stress using the sensors.

In S525, the mechanical properties of the polymer composite are obtained based on the obtained strain and stress. For example, the testing apparatus (200) shown in FIGS. 2A and 2B may produce the diagram shown in FIG. 3 based on measurements taken during the manufacturing of the polymer composite. Then, other mechanical properties such as the yield and fracture points may be obtained based on the diagram shown in FIG. 3.

In S530, the obtained mechanical properties are compared with predetermined target mechanical property values to determine whether optimal mechanical properties have been reached. If the obtained mechanical properties are similar to the target mechanical property values (e.g., within a predetermined range), the method may proceed to STEP S540. Otherwise, the method proceeds to STEP S535 where the design space parameters are modified based on the obtained mechanical properties. For example, the initial values (or the previously-applied values) of the compounding variables are modified to new values determined via one or more of the optimization methods discussed above. Once the design space parameters are modified, STEPs S510 to S530 are repeated until the obtained mechanical properties are more or less than the target mechanical values by the predetermined threshold. For example, as discussed above in reference to FIGS. 2A and 2B, the obtained mechanical properties may be fed into an optimization algorithm that adjusts the design space parameters for subsequent tests. In one or more embodiments, the obtained mechanical properties along with the compounding variables for each of the iterations may be stored, and the optimization algorithm may perform optimization based on all previous iterations.

In S540, once the compounding variables corresponding to the optimal mechanical properties are obtained, the compounding variables and the optimal mechanical properties may be saved and validated before using the compounding variables in a manufacturing line. For example, the obtained optimal mechanical properties of the polymer composite may be measured offline using conventional mechanical tests (tensile, impact) according to standard test protocols to determine whether the obtained optimal mechanical properties are optimal for the manufacturing line.

According to one or more embodiments, the design space parameters may remain unchanged during each repetition of the obtaining of the mechanical properties. For example, the polymer composite (202) in FIG. 2B that is extended from the first pair of roller units (204) to the last pair of roller units (204) may be extruded based on same compounding variables to have consistent mechanical properties for the polymer composite (202) during each test.

Figure 6:
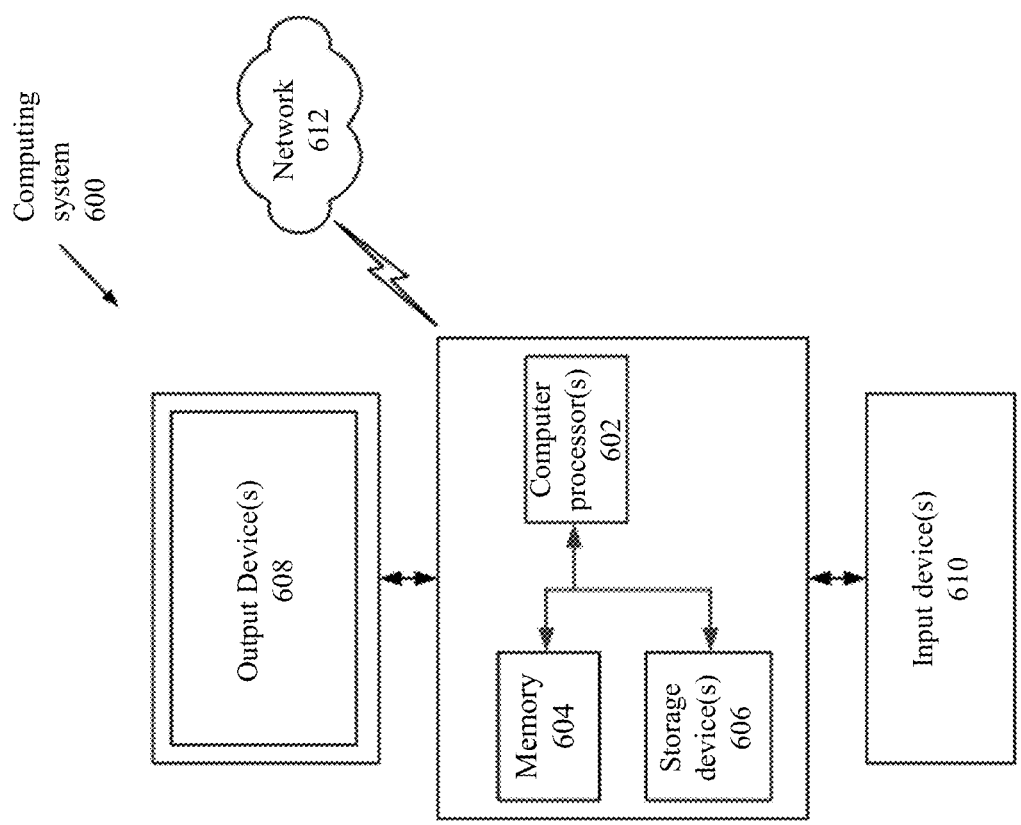
FIG. 6 shows a computing system for manufacturing the polymer composites in accordance with one or more embodiments.

Further, embodiments of the invention for controlling the compounding extruder (100) and testing apparatus (200) may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A testing apparatus for obtaining mechanical properties of a polymer composite extruded from a nozzle of a compounding extruder, the testing apparatus comprising:
    a plurality of pairs of roller units that roll the polymer composite along a first direction, wherein
        each of the pairs of roller units comprises a first roller unit and a second roller unit disposed such that a center of the first roller unit and a center of the second roller unit are separated by a predetermined distance in a second direction that is perpendicular to the first direction,
        the pairs of roller units are disposed along the first direction such that the predetermined distance of each of the pairs of roller units increases stepwise along the first direction,
        the polymer composite extruded from the nozzle has a U-shaped profile with a side wall and upper and lower portions surrounding the side wall, wherein the upper and lower portions are thicker than the side wall in a cross-sectional view of the polymer composite, and
        the pairs of roller units increasingly strain the side wall that is a vulnerable portion of the polymer composite in the second direction as the polymer composite moves through the pairs of roller units in the first direction and the predetermined distance increases stepwise; and
    a sensor that measures stress in the side wall of the polymer composite.

2. The testing apparatus according to claim 1, wherein a distance between each adjacent pairs among the pairs of roller units is constant along the first direction.

3. The testing apparatus according to claim 1, wherein the pairs of roller units are disposed along the first direction such that the predetermined distance of each of the pairs of roller units increases linearly along the first direction.

4. The testing apparatus according to claim 1, wherein
    in at least one of the pairs of roller units, the first roller unit comprises a pair of upper rollers and a pair of lower rollers, wherein
    in the second direction, the second roller unit is disposed between the pair of upper rollers and the pair of lower rollers.

5. The testing apparatus according to claim 4, wherein
    the pair of upper rollers and the pair of lower rollers of the first roller unit roll a bottom portion of the U-shaped profile, and
    the second roller unit rolls a top portion of the U-shaped profile.

6. The testing apparatus according to claim 4, wherein in a third direction perpendicular to the first direction and the second direction, the second roller unit is disposed between the pair of upper rollers and the pair of lower rollers of the first roller unit.

7. The testing apparatus according to claim 1, wherein
    the sensor comprises load cells,
    each of the load cells is disposed on a second roller unit of a respective pair of roller units, and each of the load cells measures the stress in the side wall of the polymer composite by measuring a force applied from the second roller unit of the respective pair of roller units upon rolling the polymer composite.

8. The testing apparatus according to claim 1, wherein the sensor is an optical sensor,
the optical sensor comprises a camera that acquires images of the side wall of the polymer composite, and
the sensor measures the stress on the side wall of the polymer composite using the acquired images.

9. A method for measuring mechanical properties of a polymer composite extruded from a nozzle of a compounding extruder, the method comprising:
rolling the polymer composite along a first direction using a plurality of pairs of roller units, each of the pairs comprising a first roller unit and a second roller unit, wherein
a center of the first roller unit and a center of the second roller unit are separated by a predetermined distance in a second direction that is perpendicular to the first direction, and the predetermined distance of each of the pairs of roller units increases stepwise with respect to the first direction, and
the polymer composite extruded from the nozzle has a U-shaped profile with a side wall and upper and lower portions surrounding the side wall, wherein the upper and lower portions are thicker than the side wall in a cross-sectional view of the polymer composite;
increasingly straining the side wall that is a vulnerable portion of the polymer composite in the second direction as the polymer composite moves through the pairs of roller units in the first direction and the predetermined distance increases stepwise; and
measuring stress in the side wall using a sensor.

10. The method according to claim 9, wherein
at least in one of the pairs of roller units, the first roller unit of the pair of roller units comprises a pair of upper rollers and a pair of lower rollers,
in the second direction, the second roller unit is disposed between the pair of upper rollers and the pair of lower rollers of the first roller unit, and
the rolling of the polymer composite comprises:
rolling a bottom portion of the U-shaped profile by the pair of upper rollers and the pair of lower rollers; and
rolling a top portion of the U-shaped profile by the second roller unit.

11. The method according to claim 9, wherein the stress in the side wall of the polymer composite is measured by load cells, each of which is disposed on the second roller unit of the respective pairs of roller units.

12. The method according to claim 9, wherein the stress in the side wall of the polymer composite is measured by using images of the side wall of the polymer composite acquired by a camera.

13. A non-transitory computer readable medium (CRM) storing instructions for performing operation that causes a testing apparatus to obtain mechanical properties of a polymer composite extruded from a nozzle of a compounding extruder, the operation comprising:
rolling the polymer composite along a first direction using a plurality of pairs of roller units, each of the pairs comprising a first roller unit and a second roller unit, wherein
a center of the first roller unit and a center of the second roller unit are separated by a predetermined distance in a second direction that is perpendicular to the first direction, and the predetermined distance of each of the pairs of roller units increases stepwise with respect to the first direction, and
the polymer composite extruded from the nozzle has a U-shaped profile including a thin side wall and upper and lower portions surrounding the side wall, wherein the upper and lower portions are thicker than the side wall in a cross-sectional view of the polymer composite;
increasingly straining the side wall that is a vulnerable portion of the polymer composite in the second direction as the polymer composite moves through the pairs of roller units in the first direction and the predetermined distance increases stepwise; and
measuring stress in the side wall using a sensor.

14. The CRM according to claim 13, wherein
at least in one of the pairs of roller units, the first roller unit of the pair of roller units comprises a pair of upper rollers and a pair of lower rollers,
in the second direction, the second roller unit is disposed between the pair of upper rollers and the pair of lower rollers of the first roller unit, and
the rolling of the polymer composite comprises:
rolling a bottom portion of the U-shaped profile by the pair of upper rollers and the pair of lower rollers; and
rolling a top portion of the U-shaped profile by the second roller unit.

15. The CRM according to claim 13, wherein the stress in the side wall of the polymer composite is measured by load cells, each of which is disposed on the second roller unit of the respective pairs of roller units.

16. The CRM according to claim 13, wherein the stress in the side wall of the polymer composite is measured by using images of the side wall of the polymer composite acquired by a camera.

* * * * *